(12) United States Patent
Lalam et al.

(10) Patent No.: US 11,751,243 B1
(45) Date of Patent: Sep. 5, 2023

(54) METHOD FOR SELECTING OPERATION CHANNELS IN A COMMUNICATION NETWORK AND COMMUNICATION NETWORK IMPLEMENTING SAID METHOD

(71) Applicant: SAGEMCOM BROADBAND SAS, Rueil Malmaison (FR)

(72) Inventors: Massinissa Lalam, Rueil Malmaison (FR); Laurent Alarcon, Rueil Malmaison (FR); Stanislas Faye, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 18/171,050

(22) Filed: Feb. 17, 2023

(30) Foreign Application Priority Data

Mar. 1, 2022 (FR) ...................................... 2201790

(51) Int. Cl.
*H04W 74/08* (2009.01)
*H04W 24/02* (2009.01)
*H04W 16/14* (2009.01)

(52) U.S. Cl.
CPC ............................ *H04W 74/0808* (2013.01)

(58) Field of Classification Search
CPC ........... H04W 74/0808; H04W 72/541; H04W 24/02; H04W 16/14
See application file for complete search history.

(56) References Cited

U.S. PATENT DOCUMENTS

| 7,366,511 | B2 * | 4/2008 | Jaakkola | H04W 48/16 |
| | | | | 370/338 |
| 9,066,265 | B2 * | 6/2015 | Park | H04L 5/0048 |
| 9,185,686 | B2 * | 11/2015 | Hasegawa | H04W 72/04 |
| 9,258,822 | B2 * | 2/2016 | Damodaran | H04W 4/08 |

(Continued)

FOREIGN PATENT DOCUMENTS

| FR | 2 984 554 A1 | 6/2013 |
| FR | 3 112 264 A1 | 1/2022 |
| WO | 2021/147355 A1 | 7/2021 |

OTHER PUBLICATIONS

Oct. 21, 2022 Preliminary Search Report and Written Opinion issued in French Patent Application No. 2201790.

*Primary Examiner* — Ahmed Elallam
(74) *Attorney, Agent, or Firm* — Oliff PLC

(57) ABSTRACT

A method for selecting operational channels in a communication network including a plurality of gathering nodes connected together by cable links and wireless links. The method includes: for each branch, selecting and using at least one operational channel, and informing the other branches of the selection thereof, and determining whether there exists at least one selected operational channel in common between the branch and another; identifying at least one group of branches wherein each branch has at least one selected channel in common with another in the group and wherein each branch sees from a radio-propagation point of view at least one other branch in the set; for each group of branches identified, selecting at least one operational channel by realigning within the group the selections of at least one operational channel made by branch; for each group of branches, applying the channel selected by the group.

9 Claims, 8 Drawing Sheets

(56) References Cited

U.S. PATENT DOCUMENTS

| | | | |
|---|---|---|---|
| 9,781,719 B2 * | 10/2017 | Hasegawa | H04W 72/1215 |
| 10,721,626 B2 * | 7/2020 | Barberis | H04W 72/0453 |
| 2012/0257585 A1 | 10/2012 | Sydor et al. | |
| 2015/0334612 A1 * | 11/2015 | Ray Chaudhuri | H04W 36/20 |
| | | | 455/437 |
| 2021/0368362 A1 | 11/2021 | Rengarajan et al. | |

* cited by examiner

METHOD FOR SELECTING OPERATION CHANNELS IN A COMMUNICATION NETWORK AND COMMUNICATION NETWORK IMPLEMENTING SAID METHOD

TECHNICAL FIELD

At least one embodiment relates to a method for selecting operational channels in a communication network comprising a plurality of gathering nodes connected together by cable links and wireless links. At least one other embodiment relates to a communication network implementing said method for selecting operational channels.

PRIOR ART

A wireless communication network (hereinafter "network") conforming to one of the IEEE 802.11 standards typically comprises a plurality of nodes. Each node is an electronic device comprising at a minimum a radio-frequency module for establishing communications in accordance with one or more IEEE 802.11 standards, or in other words in accordance with one or more Wi-Fi protocols. Such a network typically comprises an electronic device, commonly referred to as access point or AP, and a plurality of so-called user (or client) electronic devices able to establish wireless connections with the access point and/or with each other. In a residential environment, the access-point electronic device is typically a box provided by an internet operator, i.e. a home gateway or residential gateway. The user electronic devices are typically computers, televisions, tablets or so-called smartphones. It is thus commonly said that the user electronic devices are associated "in Wi-Fi" with the access point.

The architecture of a Wi-Fi network can thus be distributed, in order for example to extend the range of the network and/or to increase the performances thereof, by using a plurality of access points. The architecture of a distributed Wi-Fi network is different from the previous architecture briefly described. A distributed Wi-Fi network generally comprises two access networks. It comprises a so-called gathering or infrastructure access network (also called a backhaul network), for connecting the access points together and constituting a network infrastructure in accordance with a network architecture of the mixed star and/or chain type. This gathering network may be a wireless network (for example Wi-Fi), cabled (for example Ethernet) or a mixture of the two. It furthermore comprises a so-called user or client access network (also called a fronthaul network), enabling so-called user (or client) nodes (or electronic devices) to be connected to the distributed Wi-Fi network.

It is known that each node in the backhaul network selects a radio channel (e.g. primary channel in the case of Wi-Fi), referred to as an operational channel, or a radio band, referred to as an operational band, corresponding to an aggregation of operational channels (e.g. primary channel and secondary channels in the case of Wi-Fi) that it then uses for communicating with the other nodes in the backhaul network. For this purpose, an automatic operational-channel selection method, referred to as ACS (the English acronym for "Automatic Channel Selection"), is for example used in order to select, for each node, an operational channel or an operational band so as to minimise the interferences with the other nodes. By definition, nodes belonging to one and the same subset of nodes can use the same operational channel or the same operational band in order to communicate with each other.

This automatic operational-channel selection is generally implemented by a single node, referred to as the master node, which passes its decisions onto all the other nodes in the network. The selection can also be done independently at each subset of nodes by a single node in said subset, referred to as coordinator node or sub-master node, which passes its decisions onto all the other nodes in the subset. However, these solutions are suboptimal in terms of communication performances. This is because, if two subsets of nodes visible one to the other from a radio propagation point of view use two close-together operational channels, the performances in terms of communication may be degraded thereby in particular because of mechanisms of access to the media implemented within the Wi-Fi networks.

It is desirable to overcome these various drawbacks of the prior art. It is in particular desirable to propose a method for selecting operational channels in a communication network that is more efficient in terms of communication.

DISCLOSURE OF THE INVENTION

At least one embodiment relates to a method for selecting operational channels in a communication network comprising a plurality of gathering nodes connected together by cable links and wireless links, the nodes connected together solely by wireless links forming a branch, the branches being connected together by cable links. The method comprises:
   for each branch, selecting at least one operational channel, using said at least one selected operational channel for sending beacon frames and informing the other branches of the communication network of the selection thereof;
   for each branch, determining whether there exists at least one selected operational channel in common between said branch and another branch;
   identifying at least one group of branches wherein each branch has at least one selected operational channel in common with another branch in said group and wherein each branch sees from a radio-propagation point of view at least one other branch in said set;
   for each group of branches identified, selecting at least one operational channel by realigning within the group the selections of at least one operational channel made by branch;
   for each group of branches, applying the at least one operational channel selected by said group.

Thus, by realigning within the group the selections of at least one operational channel made by branch, the performances in terms of communication are improved.

In one embodiment, identifying at least one group of branches comprises:
   for each branch with at least one selected channel in common with another branch, detecting the other branches seen from a radio-propagation point of view by said branch, a branch being seen by another branch if a node in said branch perceives a signal coming from a node in the other branch with a signal level above a threshold value; and
   identifying at least one group of branches in response to said detections.

In one embodiment, for each group of branches identified, selecting at least one operational channel by realigning within the group the selections of at least one operational channel made by branch comprises selecting, for said identified group, said at least one operational channel of the branch in the group that sees the most branches from a radio-propagation point of view.

In one embodiment, selecting, for said identified group, said at least one operational channel of the branch in the group that sees the most branches from a radio-propagation point of view comprises, in the case of equality between two branches, selecting said at least one operational channel of the branch from said two branches with a highest score, the score representing a percentage of free transmission time.

In one embodiment, selecting, for said identified group, said at least one operational channel of said branch in the group that sees the most branches from a radio-propagation point of view, comprises, in the case of equality between two branches, selecting said at least one operational channel of the branch from said two branches a coordinator node of which has the smallest MAC address.

In one embodiment, selecting, for said identified group, said at least one operational channel of said branch in the group that sees the most branches from a radio-propagation point of view comprises, in the case of equality between two branches, selecting said at least one operational channel of the branch from said two branches a coordinator node of which has the largest MAC address.

At least one embodiment relates to a communication network comprising a plurality of gathering nodes connected together by cable links and wireless links, the nodes connected together solely by wireless links forming a branch, the branches being connected together by cable links. The communication network is configured for:
  for each branch, selecting at least one operational channel, using said at least one selected operational channel for sending beacon frames and informing the other branches of the communication network of the selection thereof;
  for each branch, determining whether there exists at least one selected operational channel in common between said branch and another branch;
  identifying at least one group of branches wherein each branch has at least one selected operational channel in common with another branch in said group and wherein each branch sees from a radio-propagation point of view at least one other branch in said set;
  for each group of branches identified, selecting at least one operational channel by realigning within the group the selections of at least one operational channel made by branch;
  for each group of branches, applying the at least one operational channel selected by said group.

A device for selecting operational channels in a communication network is also described. The communication network comprises a plurality of gathering nodes connected together by cable links and wireless links, the nodes connected together solely by wireless links forming a branch, the branches being connected together by cable links, each branch, selecting at least one operational channel, using said at least one selected operational channel for sending beacon frames and informing the other branches of the communication network of the selection thereof. The device for selecting operational channels is configured for:
  for each branch, determining whether there is at least one selected operational channel in common between said branch and another branch;
  identifying at least one group of branches wherein each branch has at least one selected operational channel in common with another branch in said group and wherein each branch sees from a radio-propagation point of view at least one other branch in said set;
  for each group of branches identified, selecting at least one operational channel by realigning within the group the selections of at least one operational channel made by branch;
  for each group of branches, configuring the operational channel to be applied with the at least one operational channel selected for said group.

A computer program product is also described that comprises instructions for implementing the method for selecting operational channels according to any one of the embodiments described previously, when said program is executed by a processor.

A storage medium is also described that stores a computer program comprising instructions for implementing the method for selecting operational channels according to any one of the embodiments described previously, when said program is executed by a processor.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
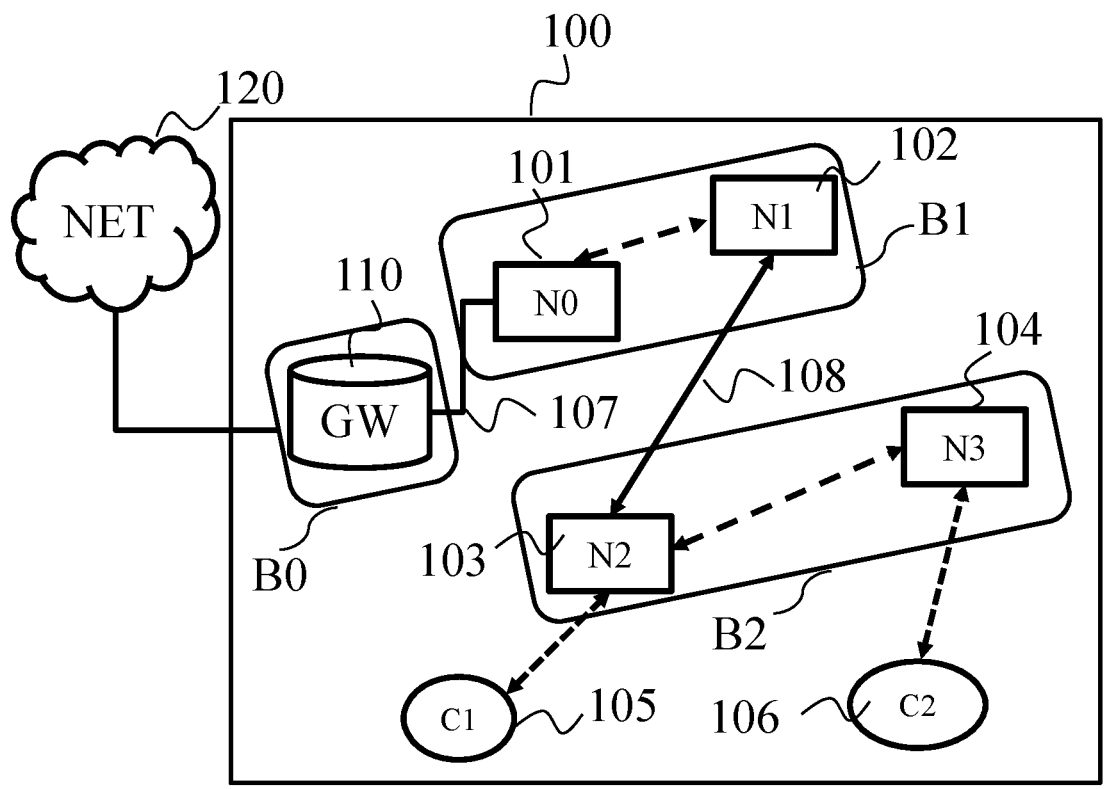
FIG. 1 illustrates schematically a communication network wherein embodiments can be implemented.

FIG. 1 illustrates schematically a communication network 100 wherein embodiments can be implemented. The distributed network 100 comprises a gateway 110 and a plurality of nodes or electronic devices N0 101, N1 102, N2 103, N3 104, C1 105 and C2 106. The gateway 110 enables the network 100 to be interconnected with a network 120, for example the internet. In this example, the nodes N0, N1, N2 and N3 are so-called gathering nodes. The nodes C1 and C2 are two user nodes connected to gathering nodes (respectively the nodes N2 and N3). The gateway 110 and the nodes N0, N1, N2 and N3 thus constitute the gathering infrastructure of the network 100. Each gathering node N0, N1, N2 or N3 can therefore establish a connection to another gathering node in order to constitute the gathering infrastructure of the distributed network 100. The gathering nodes can be connected together via a cable connection, for example of the Ethernet type, or via a wireless connection. On FIG. 1, the cable connections are represented by a solid line and the wireless connections by a broken line.

Thus, in the example illustrated by FIG. 1, the node N0 101 is connected by cable to the gateway GW 110 and to the node N2 103, for example via an Ethernet connection. The node N0 101 is connected by wireless connection to the node N1 102. Likewise, the nodes N2 103 and N3 104 are connected by wireless connection. Such a backhaul network is said to be hybrid since it is composed of cable and wireless connections. In the backhaul network, the nodes connected together solely by wireless connections form a branch. Thus, on FIG. 1, the backhaul network comprises 3 branches B0, B1 et B2. The first branch B0 comprises the gateway 110, the second branch B1 comprises the nodes N0 and N1 and the third branch comprises the nodes N2 and N3. These three branches are connected together by the cable connections 107 and 108.

Figure 2:
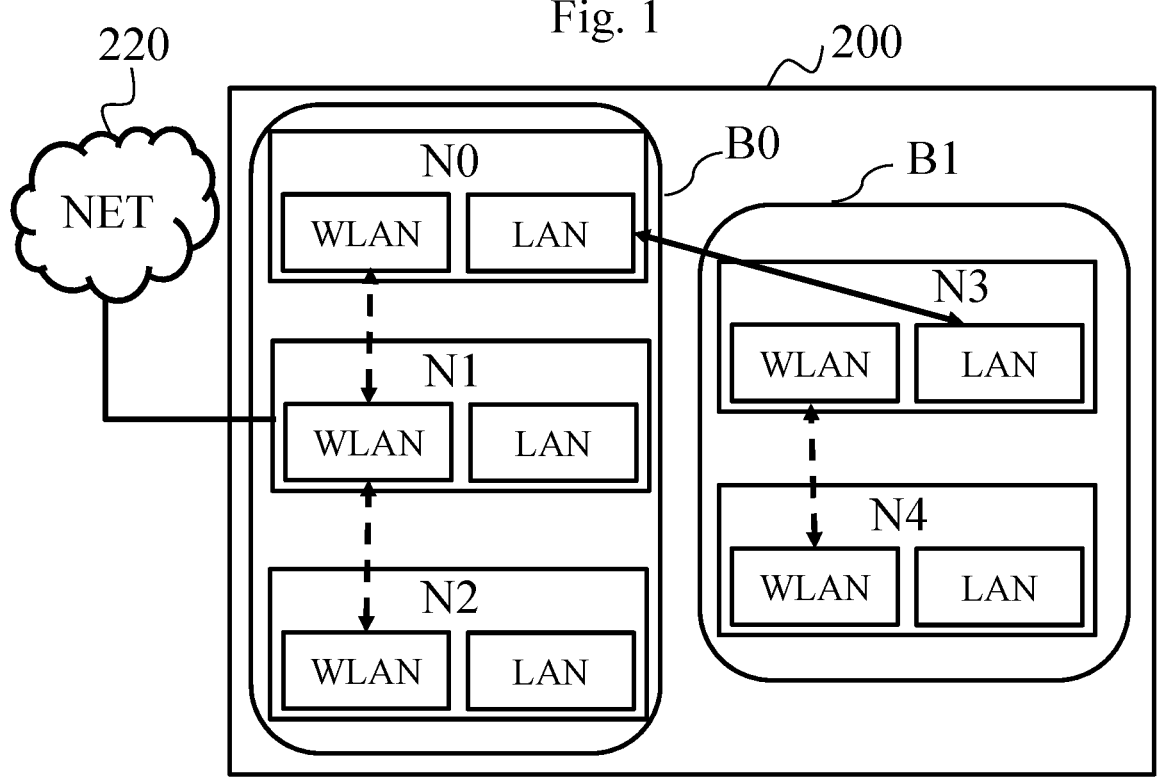
FIG. 2 illustrates schematically a communication network wherein embodiments can be implemented.

FIG. 2 illustrates schematically another communication network 200 wherein embodiments can be implemented. The communication network 200 comprises a plurality of nodes or electronic devices N0, N1, N2, N3 and N4. Each of these nodes may be a residential gateway, an extender or a set-top box. The node N1 allows an interconnection of the network 200 with a network 220, for example a network of the World Area Network or WAN type, such as the internet. In this example, the nodes N0, N1, N2, N3 and N4 are so-called gathering nodes. These nodes N0, N1, N2, N3 and N4 constitute the gathering infrastructure or backhaul network of the network 200. The communication network 200 may comprise user nodes (not shown on FIG. 2) connected to the fronthaul network broadcast by the gathering nodes.

Each of the gathering nodes has at least one WLAN (the English acronym for "Wireless Local Area Network") interface and at least one LAN (the English acronym for "Local Area Network") interface in order to connect to other nodes. A plurality of nodes can connect to the same WLAN interface of another node located higher in the topology of the network. However, only one node can connect directly to a LAN interface of another node located higher in the topology of the network. On FIG. 2, the cable connections are shown by a solid line and the wireless connections by a broken line. Thus the nodes N0 and N1 are connected by a wireless link through their WLAN interfaces. The nodes N0 and N3 are connected by a cable link through their LAN interfaces. The node N1 and the node N2 are connected by wireless link through their WLAN interfaces. The node N3 and the node N4 are connected by wireless link through their WLAN interfaces. Thus the communication network 200 is a hybrid network wherein cable links and wireless links coexist.

In the communication network 200, there are two branches B0 and B1. The branch B0 comprises the nodes N0, N1 and N2 and the branch B1 comprises the nodes N3 and N4, a branch being a set of nodes connected together solely by wireless links via their WLAN interface. The branches are connected together solely by a cable link, i.e. the LAN interface of a node of a branch, i.e. the node N0 of the branch B0 on FIG. 2, is connected to the LAN interface of another node of another branch, i.e. the node N3 of the branch B1 on FIG. 2.

Figure 3:
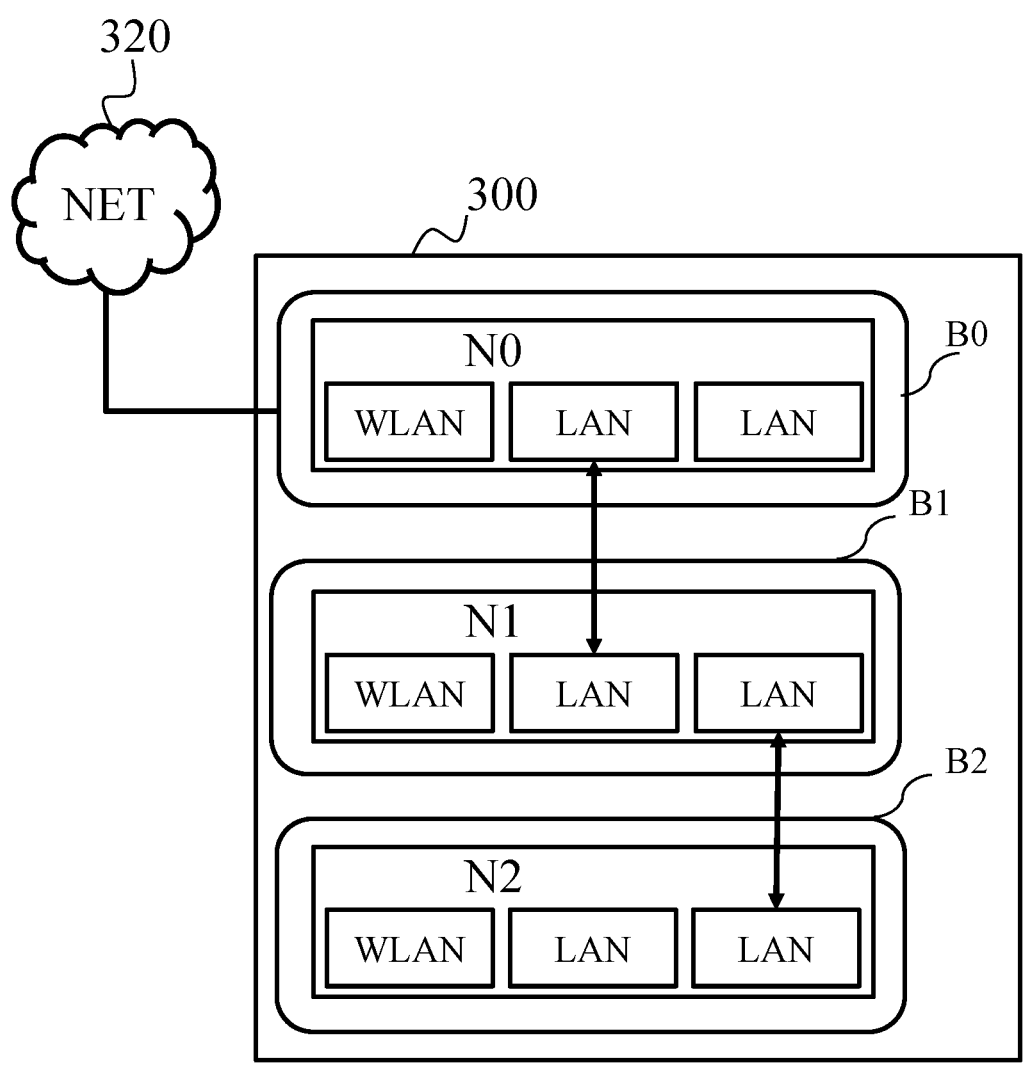
FIG. 3 illustrates schematically another example of a communication network wherein embodiments can be implemented.

FIG. 3 illustrates schematically another example of a communication network 300 wherein embodiments can be implemented. The communication network 300 comprises a plurality of nodes or electronic devices N0, N1 and N2. Each of these nodes may be a residential gateway, an extender, or a set-top box. The node N0 allows interconnection of the network 300 with a network 320, for example the internet. In this example, the nodes N0, N1 and N2 are so-called gathering nodes. These nodes N0, N1 and N2 constitute the gathering infrastructure of the network 300. The communication network 300 may comprise user nodes (not shown on FIG. 3) connected to the gathering nodes.

Each of the gathering nodes has at least one WLAN (the English acronym for "Wireless Local Area Network") interface and at least one LAN (the English acronym for "Local Area Network") interface in order to connect to other nodes. A plurality of nodes can connect to the same WLAN interface of another node located higher in the topology of the network. However, only one node can connect directly to a LAN interface of another node. On FIG. 3, the cable connections are shown by a solid line. Thus the node N0 and the node N1 are connected by a cable link through a pair of their LAN interfaces. The node N1 and the node N2 are connected by a cable link through a pair of their LAN interfaces. The LAN interfaces of the node N1 connecting it to the node N0 and N2 respectively being different (e.g. different Ethernet ports). In the communication network 300, there are three branches B0, B1 and B2. Each branch comprises a single node.

The complete topology of the communication network 200 or 300 is considered to be accessible to all the gathering nodes in the network. Generally, there is a software element, referred to as the master software element, which coordinates the operation of all the nodes in the network. This master software element can be stored in a node directly connected to the internet, e.g. in the node N1 of FIG. 2 or the node N0 of FIG. 3. In variants, this master software element is stored in any gathering node in the network or in an element external to the network (e.g. a server in the Cloud). This master software element is responsible for maintaining and communicating to each node in the network (via standardised communication protocols, e.g. IEEE 1905, or via a software bus as described in the document FR2984554) the global topology of the entire network. Thus each node can identify to which branch another node in the network belongs.

Each branch of the networks 200 or 300 is configured to implement an automatic channel-selection method ACS in order to select an operational channel (e.g. primary channel in the case of Wi-Fi) or an operational band corresponding to an aggregation of channels (e.g. primary channel serving for controlling and managing secondary channels in the case of Wi-Fi). A channel is generally identified by an index. For example, in the 5 GHz band, the channel of index 36 is centred on the frequency 5.180 GHz and the channel of index 44 is centred on the frequency 5.22 GHz. The indices of the channels are well known, each channel being defined by its centre frequency. In Wi-Fi a bandwidth equal to 20 MHz is associated with a channel (22 MHz for modulations of Amendment 802.11b of the IEEE 802.11 group of standards) so that, when for example a primary channel equal to 36 is spoken of, a centre frequency of 5.180 GHz and a bandwidth of 20 MHz is meant.

The automatic channel selection ACS method can be implemented by a coordinator node selected in the branch. The operational channels thus selected by the coordinator node are applied to all the nodes belonging to the same branch as it. If such coordinator nodes are established, then each branch coordinator node knows the identity of the other coordinator nodes via the master software element.

Figure 4:
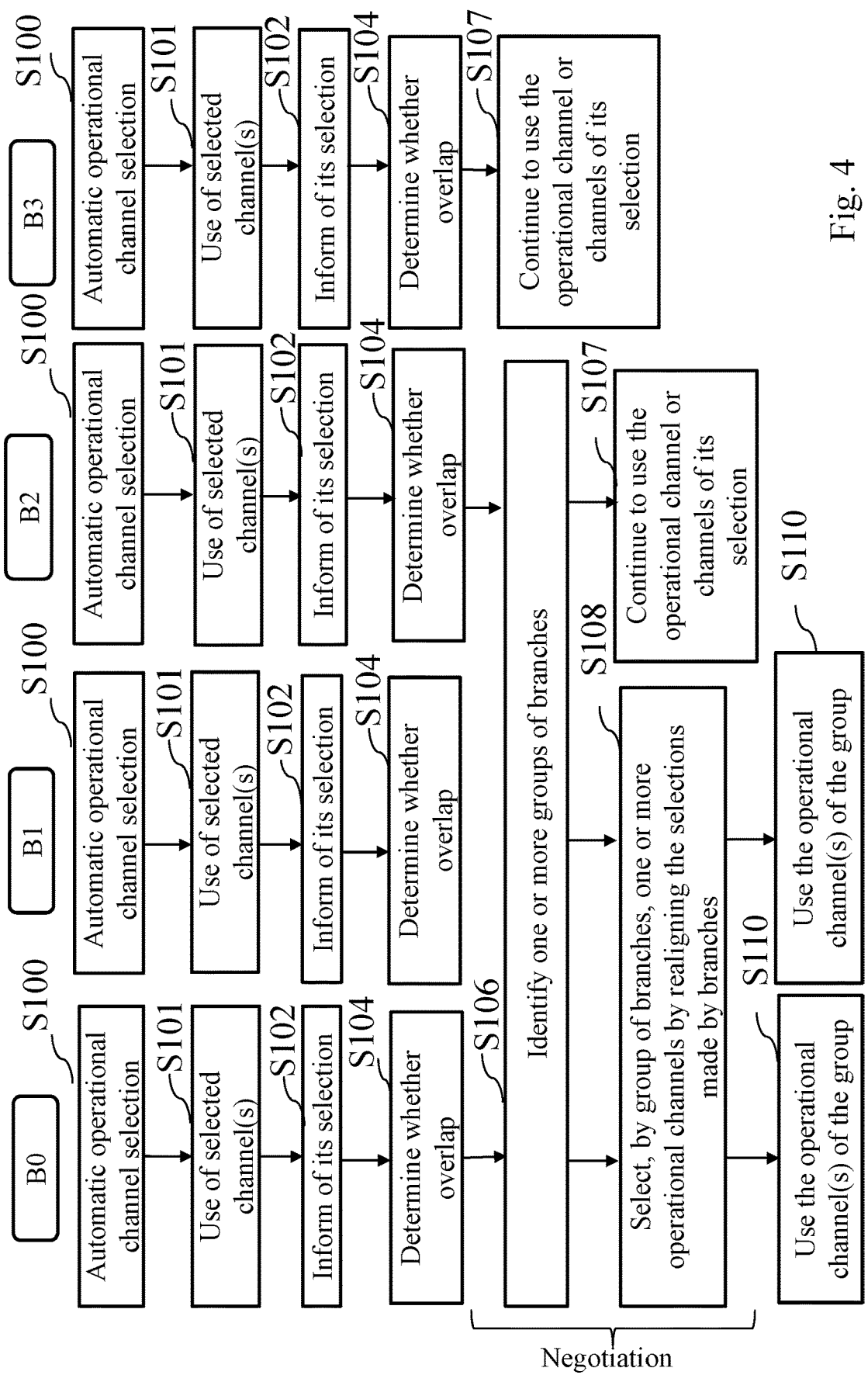
FIG. 4 illustrates schematically a method for selecting operational channels in a Wi-Fi network according to a particular embodiment.

FIG. 4 illustrates schematically a method for selecting operational channels in a communication network according to a particular embodiment. In the example of FIG. 4, the communication network comprises 4 branches B0, B1, B2, B3. The method can be implemented by coordinator nodes selected in each branch. Hereinafter, branch will solely be spoken of, the information transmitted being either distributed to all the nodes in the branch or to the coordinator node of the branch if such exists.

In a step S100, each branch, e.g. each coordinator node of said branch, independently of the other branches implements an automatic operational-channel selection ACS method and uses the operational channel or channels of its selection to send beacon frames.

Such a method can be based on the selection of the operational channels having the most free transmission time (i.e. the largest transmit opportunity) seen by the coordinator node over a given observation period for example. This step consists in determining a plurality of operational channel lists or a plurality of operational bands (e.g. [36, 40, 44, 48] with 36 as primary channel and [36, 40, 44, 48] with 40 as primary channel), each list or band being optionally associated with a score representing the result of the ACS method (for example the percentage of free transmission time observed). A list of operational channels comprises either a single operational channel, e.g. a single primary channel, or a plurality of operational channels, e.g. a primary channel and a plurality of secondary channels.

The ACS method selects a list of operational channels (or an operational band) from the plurality of lists, e.g. the one with the highest score, and thus defines a list of operational channels that can be used by the nodes of the branch.

In a step S101, each branch uses the operational channel or channels of its selection, i.e. the one or ones determined at the step S100, e.g. for sending beacon frames. This step must be performed before the step S106 described below.

In a step S102, each branch informs the other branches of the result of its automatic channel selection ACS, i.e. each branch communicates to the other branches the operational channels selected. Optionally, the score associated with this selection is also communicated.

In a step S104, each branch determines whether there is at least one selected operational channel in common between said branch and another branch. In other words, each branch determines whether there is an overlap of operational channels with another branch, i.e. whether the result of its automatic channel selection ACS and all or part of the result of automatic channel selection ACS of another branch overlap. An overlapping of operational channels between two branches results in the existence of at least one channel common to the lists of operational channels selected at the step S100 by the ACS method in each of the two branches. For example, in Wi-Fi, the branch B0 selects the operational channels [36, 40, 44, 48] with the channel 36 as primary channel, the branch B1 selects the operational channels [44, 48] with the channel 44 as primary channel. There is therefore an overlap since the operational channels 44 and 48 are common to the two lists.

In the example of FIG. 4, it is supposed that B0 determines that there is an overlap with B1, B1 determines that there is an overlap with B0 and B2, B2 determines that there is an overlap with B1, and B3 determines that there is no overlap with the other branches. In the event of overlap, the branches concerned will have to undertake an operational-channel negotiation phase (steps S106 and S108). This is the case with the branches B0, B1 and B2 on FIG. 4.

If a branch has no overlap with any one of the other branches of the network, then no operational-channel negotiation phase is undertaken by this branch. This is the case with the branch B3 on FIG. 4. This branch continues to use (step S107) the operational channel or channels of its selection, i.e. the one or ones determined at the step S100.

In a step S106, one or more groups of branches are identified. A group of branches is a set of branches wherein:
  each branch has at least one selected channel in common with another branch in said group, i.e. there is at least one overlap with another branch in said set,
  each branch sees from a radio propagation point of view at least one other branch in said set.

It is said that a branch Bi sees, from a radio propagation point of view, another branch Bj in the case where at least one node Nk of the branch Bi sees, from a radio propagation point of view, at least one node Nl of Bj where i, j, k and l are indices, e.g. positive integers, identifying the branches and the nodes. It is said that a node Ni sees, from a radio propagation point of view, a node Nj if the node Ni receives or decodes the signal sent by Nj (e.g. the beacons) with a signal level higher than a threshold value S, e.g. S=−82 dBm at 20 MHz. In the example of FIG. 4, it is supposed that, from a radio propagation point of view, B0 sees B1 and B1 and B2 do not see any other branch. B0 and B1 therefore belong to the same group since B0 sees B1 even if B1 does not see B0. In the particular case where a branch is not visible to any of the other branches of the network, then this branch continues to use (step S107) the operational channel or channels of its selection, i.e. the one or ones determined at the step S100. This is the case with the branch B2 on FIG. 4.

In a step 108, the branches belonging to one and the same group of branches negotiate with each other operational channels so as to realign the selections of the ACS method made independently by branch at the step S100.

In other words, for a group of branches, realigning the selections of the ACS method comprises selecting a single list of operational channels, all the branches of said group using this single list of operational channels. This is the case with the branches B0 and B1 on FIG. 4. In a particular embodiment, this single list of operational channels is the list selected at the step S100 by one of the branches in the group that therefore imposes its selection on the other branches in the group. In a particular embodiment, the branch Bk that sees the most branches imposes on the group its operational channels, i.e. those selected at the step S100. Nb_max is the number of branches visible to Bk, Nb_max being a positive integer.

In the event of equality, i.e. in the case where two branches see the same number Nb_max of branches, the branch with the best ACS score or the one where the MAC address of the coordinator node is the smallest (respectively the largest) imposes on the group its operational channels, i.e. those selected at the step S100. The use of the MAC address of the coordinator node makes it possible to have a deterministic mechanism for selecting the operational channels by group, thus avoiding additional exchanges between the branches to coordinate themselves. This approach enables each branch in each group to determine the operational channels to be applied without having to exchange information other than that already exchanged previously.

In a step S110, the branches apply the operational-channel selection made at the negotiation step S108, i.e. they use the operational channel or channels selected by group in particular for sending beacon frames. This is the case with the branches B0 and B1 on FIG. 4.

In a particular embodiment, the selection is done by a dedicated operational-channel selection device that is in particular configured to perform the steps S104 to S108. This device, for each group of branches, configures the operational channel to be applied with the at least one operational channel selected for said group. In the step S110, the branches apply the operational channels thus configured.

Determining overlaps between the branches and the visibility, from a radio-propagation point of view, of one branch for another branch with a view to identifying one or more groups of branches and determining whether a realignment of the operational-channel selections made independently by branch at the step S100 is necessary within each group of branches make it possible to improve communication. In particular, the realignment, for the branches in one and the same group of branches, of the operational-channel selections made independently by branch at the step S100 makes it possible, at each radio of these said branches, to benefit from the energy-detection and Wi-Fi signal detection mechanisms on the primary channel and thus best to share the medium while at least partly avoiding collisions.

This is because, before transmitting payloads on the operational channel or channels selected, a node uses mechanisms for access to the medium in order to check the availability of said medium. For example, before accessing the medium, a node detects, on all the operational channels, i.e. the primary channel and the secondary channels, that there is no energy or that it is below a threshold value. Furthermore, solely on the primary channel, it detects, by means of a decoding of the Wi-Fi signal, that there is no Wi-Fi transmission underway.

Thus, in the case where the primary channel of the branch B0 is aligned with the primary channel of the branch B1 at the end of the step S108, a node N0 of the branch B0, before accessing the medium, makes an energy detection and a signal detection on their common primary channel, which makes it possible to best detect and therefore share the medium. This is because, if a realignment is not done and, for example, the primary channel of B1 corresponds to the secondary channel of B0, the node N0 of the branch B0 applies only an energy detection to the primary channel of B1, i.e. no signal detection. By making only an energy detection, it may happen that the node N0 considers the medium to be available whereas it is not, which increases the risk of collision.

In the cases where branches are sufficiently distant from one another so that their transmissions, even with different primary channels, do not mutually interfere with each other, no realignment of the decisions of the ACSs is undertaken. This is the case with the node B2 on FIG. 4.

Figure 5:
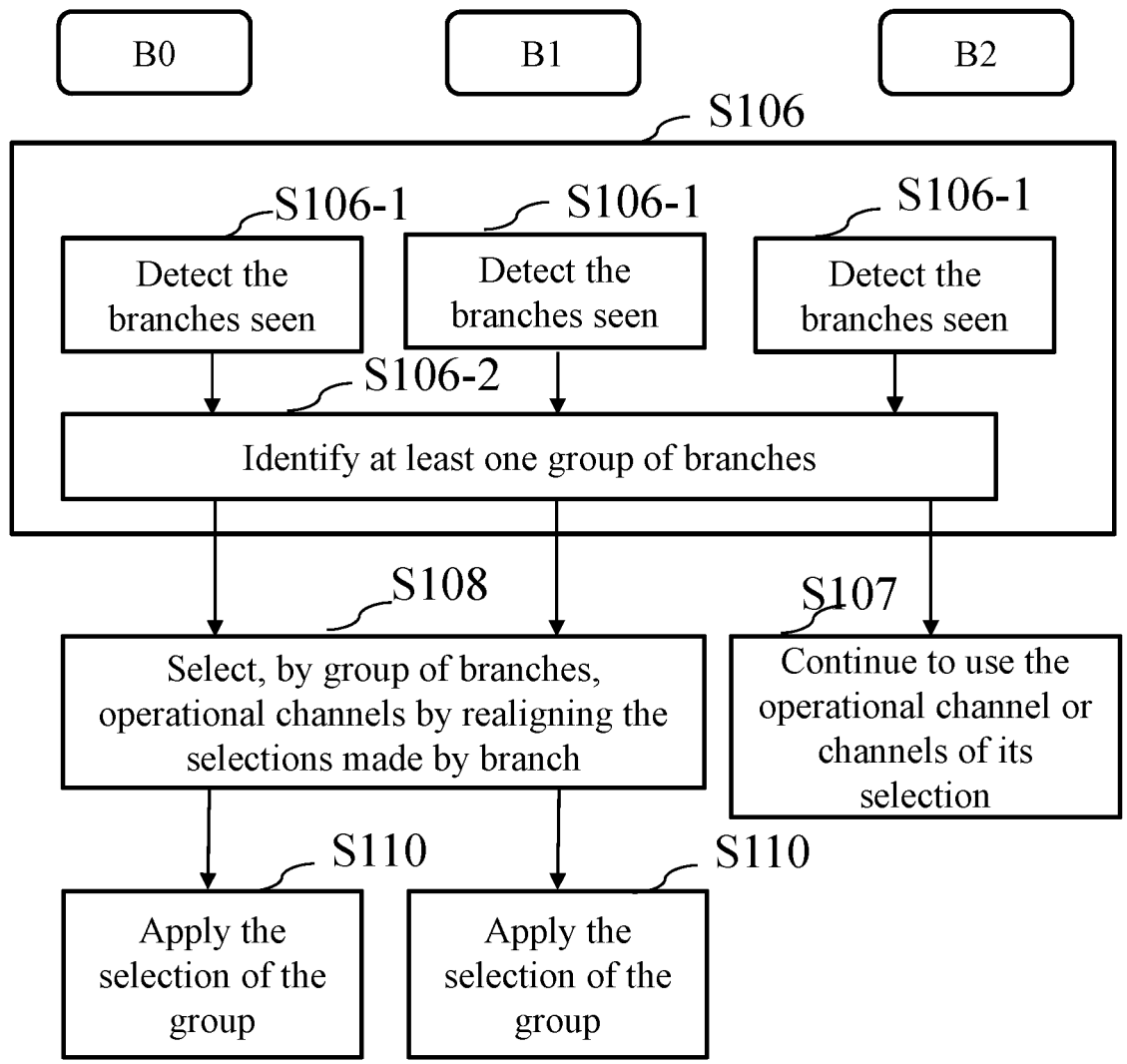
FIG. 5 illustrates in detail a step of the method for selecting operational channels according to a particular embodiment.

FIG. 5 illustrates in detail the step S106 according to a particular embodiment.

In a step S106-1, each branch detects the other branches visible from a radio-propagation point of view. A branch Bj is visible from a branch Bi if a node Nk of Bi sees at least one node Nl of Bj with a signal level above a threshold S.

The node Nk of Bi see the node Nl of Bj if the signal level received by Nk coming from Nl is above the threshold value S.

For this purpose, each branch uses the operational channel or channels of its selection, i.e. the one or ones determined at this step S100, e.g. for sending beacon frames. The branches visible from a radio-propagation point of view can then be detected for example by scanning, by the nodes of a given branch, the beacon frames sent by the nodes of the other branches. More precisely, a node Nk that decodes a frame (e.g. beacon) sent by another node Ni is capable of estimating a value representing the power with which it receives or decodes said frame. This value is compared with the threshold S, e.g. S=−82 dBm. If this value is greater than S, then the node Nk sees the node Ni, from a radio-propagation point of view, otherwise it is considered that it does not see it even if it manages to decode the frame.

In a variant, third-party equipment (e.g. user nodes) associated with a branch can be responsible for this detection. In the example in FIG. 5, it is supposed, as with FIG. 4, that B0 sees B1 and that B1 and B2 do not see any other branch.

In a step S106-2, the groups of branches are identified. For this purpose, the results of the detections of S106-1 are shared between the branches that have entered a negotiation phase, i.e. B0, B1 and B2 on FIG. 5, in order to form the groups of branches. If a branch has not been seen by any other branch, then it leaves the negotiation phase. For example, on FIG. 5, the branch B2 that is not seen by any other branch continues to use the operational channel or channels of its initial selection made at the step S100.

If a branch Bj has been seen by at least one branch Bi, then these two branches belong to the same group of branches. Within this group, which may comprise more than two branches, at least one branch sees another one. For example, the branches B0 and B1 belong to the same group since B0 has seen B1, even if B1 has not seen B0.

At the end of the step S106-2, each branch in a group may be disturbed by the other branches in the same group. On the other hand, the branches in a group cannot be disturbed by the branches in another group since they are not visible to each other.

In the step S108, a list of operational channels is selected within each group identified by means of a realignment of the ACS selections made at the step 100 by branch. The selection for a given group is made independently of the other groups. Each group of branches thus selects operational channels applicable to all the branches in the group.

Figure 6:
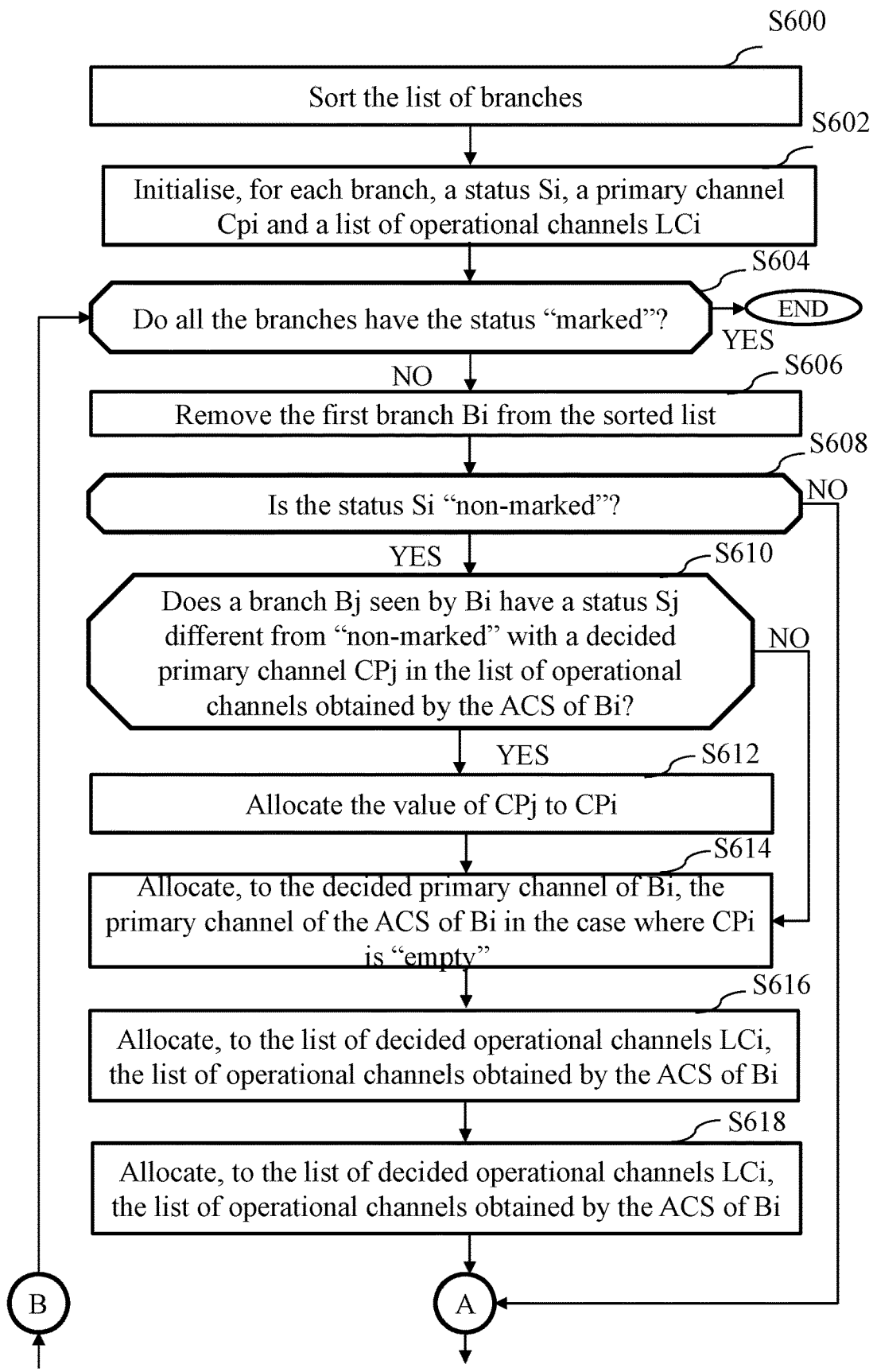
FIG. 6 illustrates a first part of a variant embodiment of a step of the method for selecting operational channels.
Figure 7:
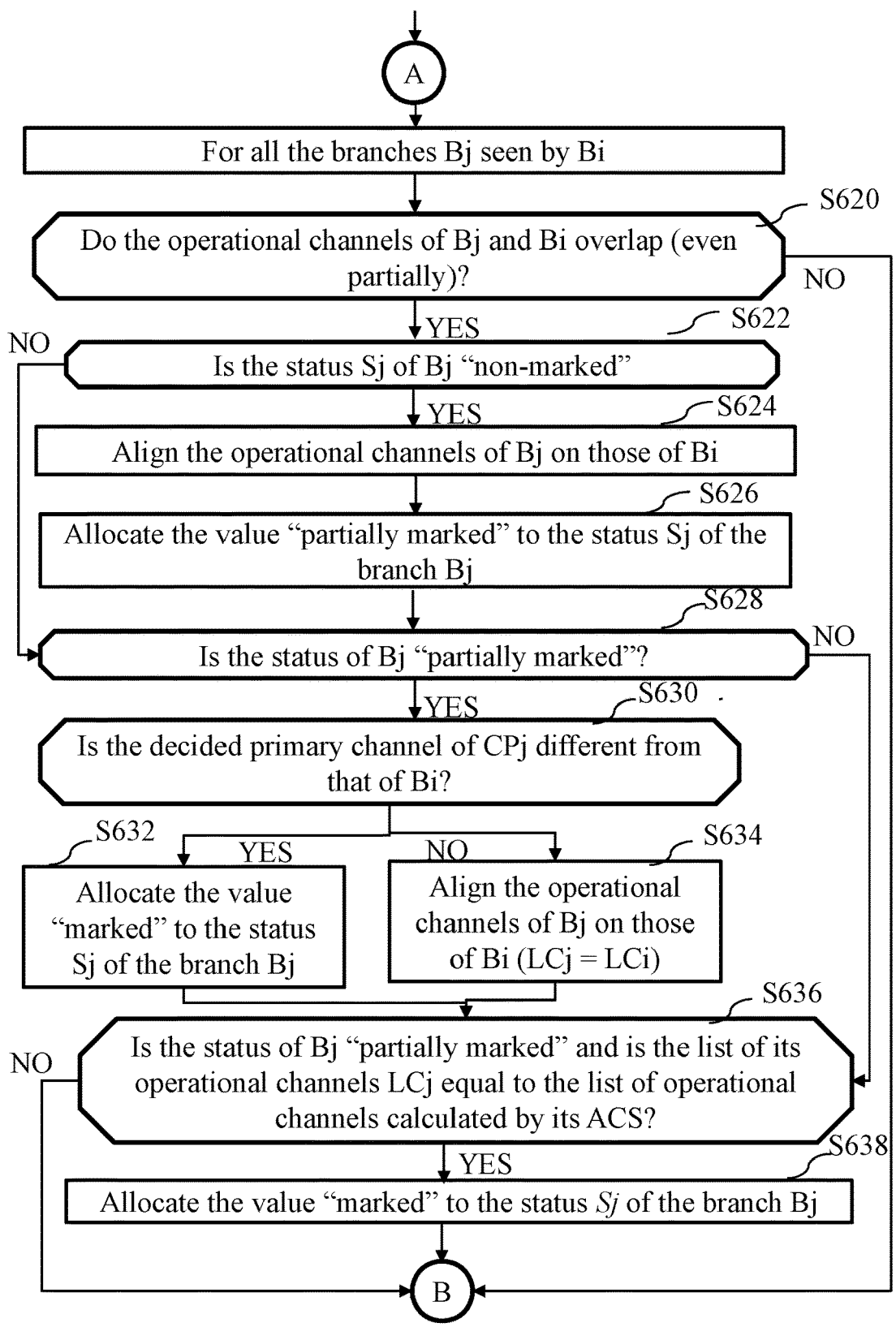
FIG. 7 illustrates a second part of a variant embodiment of a step of the method for selecting operational channels.

FIGS. 6 and 7 illustrate an example embodiment of the method implemented at the step S108. This variant is in particular advantageous in the case where the number of operational channels of each branch in one and the same group is different. For example, in Wi-Fi, a branch may have selected the channels [36 (primary channel), 40 (secondary channel at 20 MHz)] at the step S100 and another branch belonging to the same group may have selected the channels [36-40 (secondary channel at 40 MHz), 44 (primary channel), 48 (secondary channel at 20 MHz)] at the step S100, i.e. bandwidths of 40 and 80 MHz, respectively.

In a step S600, the branches in the group are sorted according to the number of their operational channels selected at the step S100. More precisely, the branch with the smallest number of operational channels is placed first and so on for the other branches. The branch with the largest number of operational channels is therefore placed last in the list.

In the case of equality between two branches, the branch Bk that sees the most branches (this positive integer being denoted Nb_max) is placed first and so on.

In the case of equality, i.e. in the case where two branches see the same number Nb_max of branches, the branch with the better ACS score or the one where the MAC address of the coordinator node is the smallest (respectively the largest) is placed first.

In a step S602, the branches are initialised. For this purpose, a status Sk initialised to "non-marked", an initially empty primary channel CPk and an initially empty list of operational channels LCk are attributed to each branch Bk. In the course of the method, the status Sk can take the following values:
- "non-marked" signifying that the branch has not yet been processed;
- "partially marked" signifying that the branch has been partially processed, i.e. that some of its operational channels have been fixed (including the primary channel);
- "marked" signifying that the branch has all its operational channels fixed, these being able to be different from those obtained by its ACS at the step S100.

In a step S604, the status of all the branches is checked. If all the branches have a status that is "marked" then the method ends, otherwise it continues at the step S606.

In the step S606, the first branch in the list is then removed from the sorted list and is considered hereinafter to be a current branch denoted Bi.

In a step S608, the status Si of the current branch Bi is checked. In the case where Si is "non-marked", then the method continues at a step S610, otherwise it continues at a branching A.

In the step S610, the status of each branch Bj seen by Bi is checked one by one (as long as the primary channel CPi of the current branch Bi is "empty").

In the case where a branch Bj seen by Bi has a status Sj different from "non-marked" with a primary channel CPj not "empty" (i.e. a decided value, i.e. a value selected by the method currently being implemented) that is located in the list of operational channels obtained by the ACS of Bi at the step S100, the method continues at a step S612. Otherwise the following adjacent branch is passed to (the loop is continued).

In the step S612, the decided primary channel, i.e. its value having been selected, of the adjacent branch Bj is allocated to the decided primary channel of Bi, i.e. CPi=CPj. The method then passes to the step S614 (exit from the loop).

In the step S614, in the case where the decided primary channel of Bi is "empty", allocating to the decided primary channel of Bi the primary channel obtained at the step S100 by the ACS of Bi.

In the step S616, the list of operational channels obtained by the ACS of Bi are allocated to the list of decided operational channels LCi of Bi.

In a step S618, the value "marked" is allocated to the status Si.

With reference to FIG. 7, for all the branches Bj seen by Bi, the following steps S620 to S638 are repeated.

In a step S620, the operational channels of Bi and those of Bj are compared. If they overlap (even partially), the method continues at the step S622, otherwise it continues at a branching B.

In the step S622, the status of Bj is checked. In the case where the status Sj of Bj is "non-marked", the method continues at a step S624. Otherwise it continues at a step S628.

In the step S624, the operational channels of Bj are aligned on those of Bi, i.e. the value of CPi is allocated to CPj and the value of LCi is allocated to LCj.

In a step S626, the value "partially marked" is allocated to the status Sj of the branch Bj.

In the step S628, the status of Bj is checked. In the case where the status of Bj is "partially marked" the method continues at the step S630, otherwise it continues at a step S636.

In a step S630, the decided primary channel of Bj is compared with the primary channel of Bi.

If the primary channel of Bj is different from the primary channel of Bi (i.e. CPi CPj), then the method continues at a step S632, otherwise it continues at a step S634.

In the step S632, the value "marked" is allocated to the status Sj of the branch Bj.

In the step S634, the operational channels of Bj are aligned on those of Bi (LCj=LCi).

In a step S636, in the case where the status of Bj is "partially marked" and the list of its operational channels LCj is equal to the list of operational channels obtained by its ACS at the step S100, the method continues at the step S638, otherwise the method resumes at the branching B.

The method described with reference to FIGS. 6 and 7 is more simply described by the following pseudocode:

For each branch Bi of the sorted list:

If its status Si is "non-marked",
    For all the branches Bj seen by Bi:
        If the primary channel CPi is empty:
            If the status Sj of Bj is "partially marked" or "marked"
                If the primary channel CPj of Bj is located in the list of operational channels calculated by the ACS of Bi, then the channel CPj is allocated to CPi (CPi = CPj)
    If the primary channel CPi is empty:
        The value obtained by the ACS of the branch Bi is allocated to CPi
        The list of operational channels LCi of Bi is confirmed as being the list of operational channels calculated by the ACS of Bi
        The status "marked" is given to the branch Bi.
    For all the branches Bj seen by Bi:
        If the operational channels of Bi and those of Bj overlap (even partially):
            If the status Sj of Bj is "non-marked",
                The operational channels of Bj are aligned on those of Bi (CPj = CPi and LCj = LCi)
                The status "partially marked" is given to the branch Bj
            If the status of Bj is "partially marked" or "marked"
                If the primary channel of Bj is different from that of Bj (CPi ≠ CPj):
                    If the status of Bj is "partially marked"
                        The status "marked" is given to the branch Bj and thus the list of operational channels of Bj is not extended to that of Bi (the primaries being different)
                If the primary channel of Bj is equal to that of Bj (CPi = CPj):
                    If the status of Bj is "partially marked"
                        The operational channels of Bj are aligned on those of Bi (LCj = LCi)

If the status of Bj is "partially marked" and the
list of its operational channels LPj is equal to the list of
operational channels calculated by its ACS,
   The status "marked" is given to the
branch Bj
If all the branches are marked, it is possible to leave the
loop.

Figure 8:
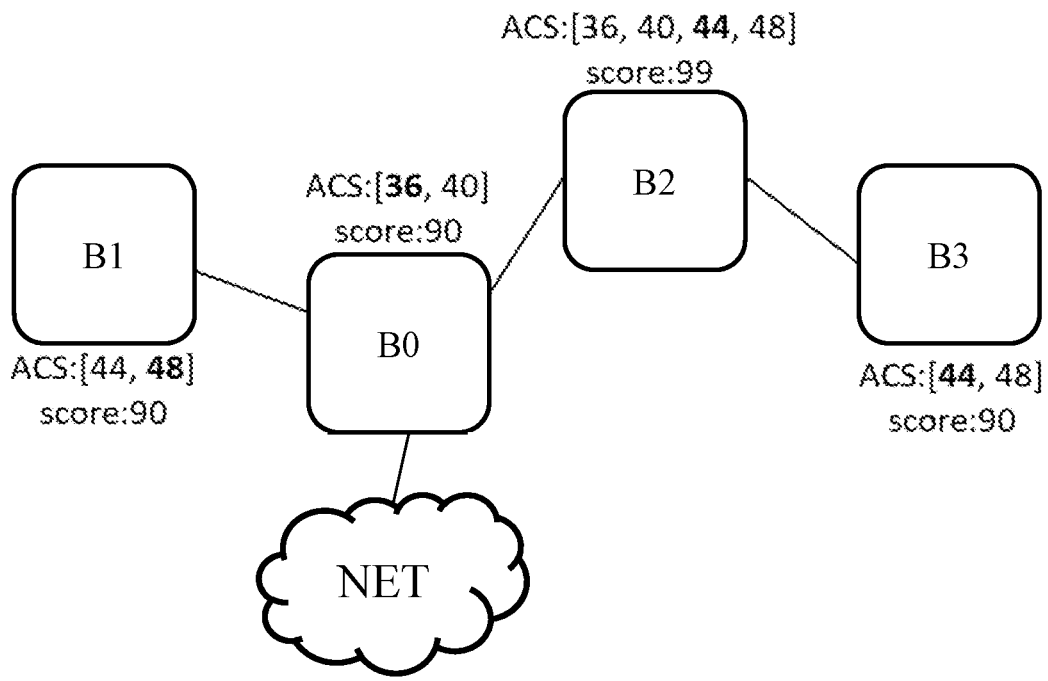
FIG. 8 shows a network comprising branches with each of which a list of operational channels is associated and wherein the variant illustrated by FIGS. 6 and 7 is implemented.

FIG. 8 shows a network comprising branches B0 to B3 with each of which a list of operational channels determined in the step S100 is associated and in which the step S108-3 described in relation to FIGS. 6 and 7 is performed. These branches B0 to B3 belong to one and the same group.

In this example, it is considered that the branch B0 sees the branch B1 and the branch B2. In the step S100, the branch B0 has selected, for operational channels, the channels [36, 40] with a score of 90, the primary channel (in bold) being the channel 36. It is considered that the branch B1 sees the branch B0. In the step S100, the branch B1 has selected for operational channels the channels [44, 48] with a score of 90, the primary channel (in bold) being the channel 48. It is considered that the branch B2 sees the branch B0 and the branch B3. In the step S100, the branch B2 has selected as operational channels the channels [36, 40, 44, 48] with a score of 99, the primary channel (in bold) being the channel 44. The branch B3 sees the branch B2. In the step S100, the branch B3 has selected as operational channels the channels [44, 48] with a score of 90, the primary channel (in bold) being the channel 44.

The branches B0, B1, B2 and B3 that belong to the same group will therefore apply the step S108-2 as described above with reference to FIGS. 6 and 7.

The sorted list of the branches is then [B0, B1, B3, B2]. The branch B0 is processed first. It receives the status "marked". B0 has the decision [36,40]. There is no overlap with the branch B1 that it sees, and therefore B1 keeps its "non-marked" status. On the other hand, there is overlap with the branch B2 that it sees and that has the status "non-marked". B2 adopts as new primary channel that of B0 (i.e. the channel 36), i.e. CP2=CP0 and LP2=LP0=[36, 40]. B2 receives the status "partially marked". This is because not all the channels initially allocated to B2, in particular the channels 44 and 48, have been processed, i.e. allocated to the list LP2.

The branch B1 is next processed. Its status is "non-marked". B1 receives the status "marked". B1 has the decision [44, 48].

The branch B3 is next processed. Its status is "non-marked". B3 receives the status "marked". B3 has the decision [44, 48]. The branch B2 has an overlap with B3 and has a status "partially marked". The primary channel B2 (the channel 36) being different from that of B3 (the channel 44), extending the operational channels of B2 to those of B3 would cause a non-alignment of primary channels for visible branches. The number of operational channels of B2 is therefore reduced and its decision is fixed. B2 then receives the status "marked".

All the branches having a status "marked", the step S108-2 ends.

Figure 9:
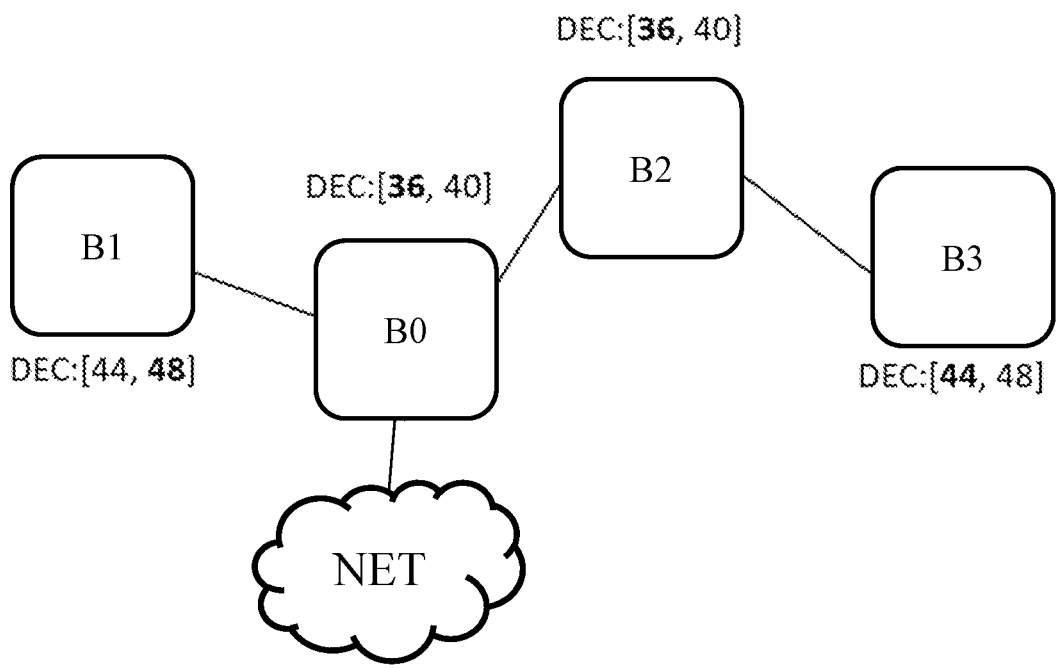
FIG. 9 shows the network illustrated by FIG. 8 after implementation of the variant illustrated by FIGS. 6 and 7.

The operational channels selected at the end of the step S108-2 are illustrated on FIG. 9. On this FIG. 8, the branches B0 and B2 are aligned, i.e. they use the same operational channels with the same primary channel. The branch B2 has reduced its bandwidth (i.e. its number of operational channels) in order to avoid an overlap of the primary channels with B0 and B3 that it sees, i.e. that are within range thereof. The branch B1 and the branch B3 do not have their primary channel aligned but they are not visible to each other. In this way branches visible to each other choosing different primary channels is avoided.

Figure 10:
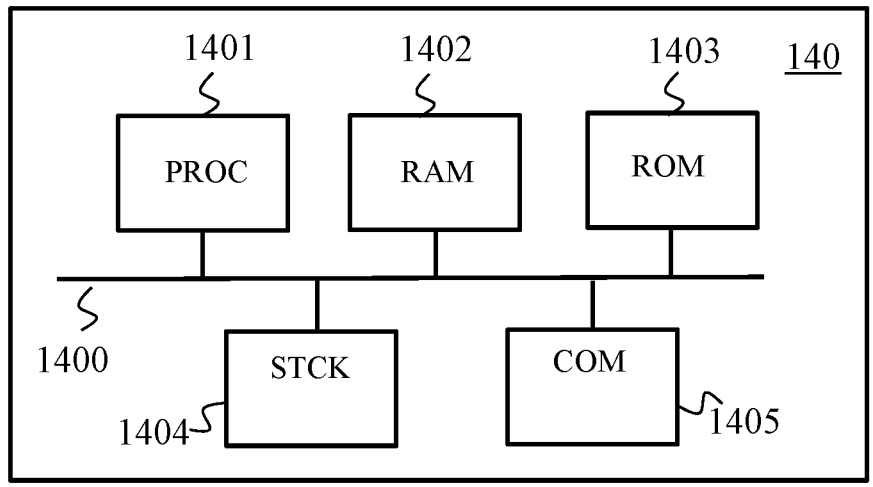
FIG. 10 illustrates schematically an example of hardware architecture of a gathering node according to a particular embodiment.

FIG. 10 illustrates schematically an example of hardware architecture of a gathering node 140 according to a particular embodiment.

According to the example of hardware architecture shown in FIG. 10, the gathering node 140 then comprises, connected by a communication bus 1400: a processor or CPU (central processing unit) 1401; a random access memory RAM 1402; a read only memory ROM 1403; a storage unit 1404 such as a hard disk or such as a storage medium reader, e.g. an SD (Secure Digital) card reader; at least one communication interface 1405 enabling the gathering node 140 to send or receive information.

The processor 1401 is capable of executing instructions loaded in the RAM 1402 from the ROM 1403, from an external memory (not shown), from a storage medium (such as an SD card), or from a communication network. When a gathering node 140 is powered up, the processor 1401 is capable of reading instructions from the RAM 1402 and executing them. These instructions form a computer program causing the implementation, by the processor 1401, of all or some of the methods described in relation to FIGS. 4 to 7.

The method described in relation to FIGS. 4 to 7 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the gathering node 140 comprises electronic circuitry configured to implement all or some of the methods described in relation to FIGS. 4 to 7.

Figure 11:
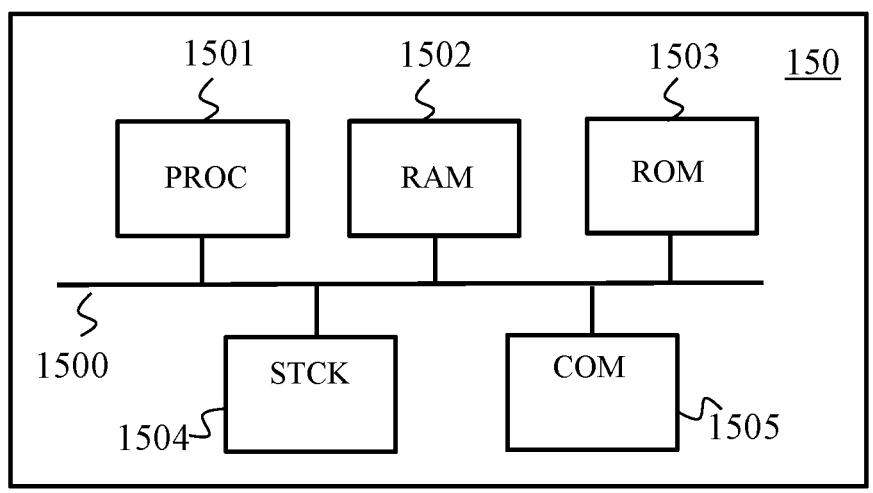
FIG. 11 illustrates schematically an example of hardware architecture of a device for selecting operational channels according to a particular embodiment.

FIG. 11 illustrates schematically an example of hardware architecture of a device 150 for selecting operational channels according to a particular embodiment.

According to the example of hardware architecture shown in FIG. 11, the device 150 then comprises, connected by a communication bus 1500: a processor or CPU (central processing unit) 1501; a random access memory RAM 1502; a read only memory ROM 1503; a storage unit 1504 such as a hard disk or such as a storage medium reader, e.g. an SD (Secure Digital) card reader; at least one communication interface 1505 enabling the device 150 to send or receive information.

The processor 1501 is capable of executing instructions loaded in the RAM 1502 from the ROM 1503, from an external memory (not shown), from a storage medium (such as an SD card), or from a communication network. When a device 150 is powered up, the processor 1501 is capable of reading instructions from the RAM 1502 and executing them. These instructions form a computer program causing the implementation, by the processor 1501, of all or some of the methods described in relation to FIGS. 4 to 7.

The method described in relation to FIGS. 4 to 7 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the device 150 comprises electronic circuitry configured to implement all or some of the methods described in relation to FIGS. 4 to 7.

The invention claimed is:

1. A method for selecting operational channels in a communication network comprising a plurality of gathering nodes connected together by cable links and wireless links, the nodes connected together solely by wireless links forming a branch, the branches being connected together by cable links, said method comprising:
   for each branch, selecting at least one operational channel, using said at least one selected operational channel for sending beacon frames and informing the other branches of the communication network of the selection thereof;
   for each branch, determining whether there exists at least one selected operational channel in common between said branch and another branch;
   identifying at least one group of branches wherein each branch has at least one selected operational channel in common with another branch in said group and wherein each branch sees from a radio-propagation point of view at least one other branch in said set;
   for each group of branches identified, selecting at least one operational channel by realigning within the group the selections of at least one operational channel made by branch;
   for each group of branches, applying the at least one operational channel selected by said group.

2. The method according to claim 1, wherein identifying at least one group of branches comprises:
   for each branch with at least one selected channel in common with another branch, detecting the other branches seen from a radio-propagation point of view by said branch, a branch being seen by another branch if a node in said branch perceives a signal coming from a node in the other branch with a signal level above a threshold value; and
   identifying at least one group of branches in response to said detections.

3. The method according to claim 1, wherein, for each group of branches identified, selecting at least one operational channel by realigning within the group the selections of at least one operational channel made by branch comprises selecting, for said identified group, said at least one operational channel of the branch in the group that sees the most branches from a radio-propagation point of view.

4. The method according to claim 1, wherein selecting, for said identified group, said at least one operational channel of the branch in the group that sees the most branches from a radio-propagation point of view comprises, in the case of equality between two branches, selecting said at least one operational channel of the branch from said two branches with a highest score, the score representing a percentage of free transmission time.

5. The method according to claim 1, wherein selecting, for said identified group, said at least one operational channel of said branch in the group that sees the most branches from a radio-propagation point of view, comprises, in the case of equality between two branches, selecting said at least one operational channel of the branch from said two branches a coordinator node of which has the smallest MAC address.

6. The method according to claim 1, wherein selecting, for said identified group, said at least one operational channel of said branch in the group that sees the most branches from a radio-propagation point of view comprises, in the case of equality between two branches, selecting said at least one operational channel of the branch from said two branches a coordinator node of which has the largest MAC address.

7. A communication network comprising a plurality of gathering nodes connected together by cable links and wireless links, the nodes connected together solely by wireless links forming a branch, the branches being connected together by cable links, said communication network being configured for:
   for each branch, selecting at least one operational channel, using said at least one selected operational channel for sending beacon frames and informing the other branches of the communication network of the selection thereof;
   for each branch, determining whether there exists at least one selected operational channel in common between said branch and another branch;
   identifying at least one group of branches wherein each branch has at least one selected operational channel in common with another branch in said group and wherein each branch sees from a radio-propagation point of view at least one other branch in said set;
   for each group of branches identified, selecting at least one operational channel by realigning within the group the selections of at least one operational channel made by branch;
   for each group of branches, applying the at least one operational channel selected by said group.

8. A device for selecting operational channels in a communication network comprising a plurality of gathering nodes connected together by cable links and wireless links, the nodes connected together solely by wireless links forming a branch, the branches being connected together by cable links, each branch, selecting at least one operational channel, using said at least one selected operational channel for sending beacon frames and informing the other branches of the communication network of the selection thereof, said device being configured for:
   for each branch, determining whether there is at least one selected operational channel in common between said branch and another branch;
   identifying at least one group of branches wherein each branch has at least one selected operational channel in common with another branch in said group and wherein each branch sees from a radio-propagation point of view at least one other branch in said set;
   for each group of branches identified, selecting at least one operational channel by realigning within the group the selections of at least one operational channel made by branch;
   for each group of branches, configuring the operational channel to be applied with the at least one operational channel selected for said group.

9. A storage medium storing a computer program comprising instructions for implementing the operational-channel selection method according to claim 1, when said program is executed by a processor.

* * * * *